United States Patent
Liu et al.

(10) Patent No.: US 8,730,955 B2
(45) Date of Patent: *May 20, 2014

(54) HIGH SPEED PACKET CAPTURE

(75) Inventors: Weimin Liu, Sunnyvale, CA (US); Erik de la Iglesia, Mountain View, CA (US); William Deninger, San Jose, CA (US); Rick Lowe, Menlo Park, CA (US); Stephen Broeker, Mountain View, CA (US)

(73) Assignee: McAfee, Inc., Santa Clara, CA (US)

( * ) Notice: Subject to any disclaimer, the term of this patent is extended or adjusted under 35 U.S.C. 154(b) by 454 days.

This patent is subject to a terminal disclaimer.

(21) Appl. No.: 13/024,923

(22) Filed: Feb. 10, 2011

(65) Prior Publication Data

US 2011/0149959 A1 Jun. 23, 2011

Related U.S. Application Data

(63) Continuation of application No. 11/202,438, filed on Aug. 12, 2005, now Pat. No. 7,907,608.

(51) Int. Cl.
*H04L 12/28* (2006.01)
*H04L 1/00* (2006.01)
*G06F 12/00* (2006.01)

(52) U.S. Cl.
CPC .............. *H04L 1/0083* (2013.01); *G06F 12/00* (2013.01)
USPC .......................................... 370/389; 710/316

(58) Field of Classification Search
CPC ....................................................... G06F 12/00
USPC ............................ 370/389, 255, 238; 709/203
See application file for complete search history.

(56) References Cited

U.S. PATENT DOCUMENTS

| | | | |
|---|---|---|---|
| 4,286,255 | A | 8/1981 | Siy |
| 4,710,957 | A | 12/1987 | Bocci et al. |
| 5,249,289 | A | 9/1993 | Thamm et al. |
| 5,465,299 | A | 11/1995 | Matsumoto et al. |
| 5,479,654 | A | 12/1995 | Squibb |
| 5,497,489 | A | 3/1996 | Menne |

(Continued)

FOREIGN PATENT DOCUMENTS

| | | |
|---|---|---|
| EP | 2499806 | 9/2012 |
| WO | WO 01/99373 | 12/2001 |
| WO | WO 2004/008310 | 1/2004 |
| WO | WO 2012/060892 | 5/2012 |

OTHER PUBLICATIONS

Han, OLAP Mining: An Integration of OLAP with Data Mining, Oct. 1997, pp. 1-18.

(Continued)

*Primary Examiner* — Wei Zhao
*Assistant Examiner* — Lionel Preval
(74) *Attorney, Agent, or Firm* — Patent Capital Group

(57) ABSTRACT

Packets can be read from a network interface into an application using a single kernel copy. In one embodiment, the invention includes a receiver packet memory to store captured packets, and a network interface driver operating in a kernel of a device to read packets captured by network interface hardware into the kernel by storing captured packets in the receiver packet memory. Then, an application interface can expose the receiver packet memory to an application executing on the device by representing the receiver packet memory as a virtual file.

20 Claims, 7 Drawing Sheets

(56) References Cited

U.S. PATENT DOCUMENTS

| | | |
|---|---|---|
| 5,542,090 A | 7/1996 | Henderson et al. |
| 5,557,747 A | 9/1996 | Rogers et al. |
| 5,623,652 A | 4/1997 | Vora et al. |
| 5,768,578 A | 6/1998 | Kirk |
| 5,781,629 A | 7/1998 | Haber et al. |
| 5,787,232 A | 7/1998 | Greiner et al. |
| 5,794,052 A | 8/1998 | Harding |
| 5,813,009 A | 9/1998 | Johnson et al. |
| 5,873,081 A | 2/1999 | Harel |
| 5,924,096 A | 7/1999 | Draper et al. |
| 5,937,422 A | 8/1999 | Nelson et al. |
| 5,943,670 A | 8/1999 | Prager |
| 5,987,610 A | 11/1999 | Franczek et al. |
| 5,995,111 A | 11/1999 | Morioka et al. |
| 6,026,411 A | 2/2000 | Delp |
| 6,073,142 A | 6/2000 | Geiger et al. |
| 6,078,953 A | 6/2000 | Vaid et al. |
| 6,094,531 A | 7/2000 | Allison et al. |
| 6,108,697 A | 8/2000 | Raymond et al. |
| 6,122,379 A | 9/2000 | Barbir |
| 6,161,102 A | 12/2000 | Yanagilhara et al. |
| 6,175,867 B1 | 1/2001 | Taghadoss |
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 | 9/2001 | Richards |
| 6,336,186 B1 | 1/2002 | Dyksterhouse et al. |
| 6,343,376 B1 | 1/2002 | Saxe et al. |
| 6,356,885 B2 | 3/2002 | Ross et al. |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,411,952 B1 | 6/2002 | Bhrat et al. |
| 6,457,017 B2 | 9/2002 | Watkins et al. |
| 6,460,050 B1 | 10/2002 | Pace et al. |
| 6,493,761 B1 | 12/2002 | Baker et al. |
| 6,499,105 B1 | 12/2002 | Yoshiura et al. |
| 6,502,091 B1 | 12/2002 | Chundi et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,556,964 B2 | 4/2003 | Haug et al. |
| 6,556,983 B1 | 4/2003 | Altschuler et al. |
| 6,571,275 B1 | 5/2003 | Dong et al. |
| 6,584,458 B1 | 6/2003 | Millett et al. |
| 6,598,033 B2 | 7/2003 | Ross et al. |
| 6,629,097 B1 | 9/2003 | Keith |
| 6,662,176 B2 | 12/2003 | Brunet et al. |
| 6,665,662 B1 | 12/2003 | Kirkwood et al. |
| 6,675,159 B1 | 1/2004 | Lin et al. |
| 6,691,209 B1 | 2/2004 | O'Connell |
| 6,754,647 B1 | 6/2004 | Tackett et al. |
| 6,757,646 B2 | 6/2004 | Marchisio |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,804,627 B1 | 10/2004 | Marokhovsky et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,976,053 B1 | 12/2005 | Tripp et al. |
| 6,978,297 B1 | 12/2005 | Piersol |
| 6,978,367 B1 | 12/2005 | Hind et al. |
| 7,007,020 B1 | 2/2006 | Chen et al. |
| 7,020,654 B1 | 3/2006 | Najmi |
| 7,020,661 B1 | 3/2006 | Cruanes et al. |
| 7,062,572 B1 | 6/2006 | Hampton |
| 7,062,705 B1 | 6/2006 | Kirkwood et al. |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,103,607 B1 | 9/2006 | Kirkwood et al. |
| 7,130,587 B2 | 10/2006 | Hikokubo et al. |
| 7,133,400 B1 | 11/2006 | Henderson et al. |
| 7,139,973 B1 | 11/2006 | Kirkwood et al. |
| 7,143,109 B2 | 11/2006 | Nagral et al. |
| 7,158,983 B2 | 1/2007 | Willse et al. |
| 7,181,769 B1 | 2/2007 | Keanini et al. |
| 7,185,073 B1 | 2/2007 | Gai et al. |
| 7,185,192 B1 | 2/2007 | Kahn |
| 7,194,483 B1 | 3/2007 | Mohan et al. |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,254,632 B2 | 8/2007 | Zeira et al. |
| 7,266,845 B2 | 9/2007 | Hypponen |
| 7,272,724 B2 | 9/2007 | Tarbotton et al. |
| 7,277,957 B2 | 10/2007 | Rowley et al. |
| 7,290,048 B1 | 10/2007 | Barnett et al. |
| 7,293,067 B1 | 11/2007 | Maki et al. |
| 7,293,238 B1 | 11/2007 | Brook et al. |
| 7,296,011 B2 | 11/2007 | Chaudhuri et al. |
| 7,296,070 B2 | 11/2007 | Sweeney et al. |
| 7,296,088 B1 | 11/2007 | Padmanabhan et al. |
| 7,296,232 B1 | 11/2007 | Burdick et al. |
| 7,299,277 B1 | 11/2007 | Moran et al. |
| 7,299,489 B1 | 11/2007 | Branigan et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,467,202 B2 | 12/2008 | Savchuk |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 | 3/2009 | Schuba et al. |
| 7,506,055 B2 | 3/2009 | McClain et al. |
| 7,506,155 B1 | 3/2009 | Stewart et al. |
| 7,509,677 B2 | 3/2009 | Saurabh et al. |
| 7,516,492 B1 | 4/2009 | Nisbet et al. |
| 7,539,683 B1 | 5/2009 | Satoh et al. |
| 7,551,629 B2 | 6/2009 | Chen et al. |
| 7,577,154 B1 | 8/2009 | Yung et al. |
| 7,581,059 B2 | 8/2009 | Gupta et al. |
| 7,596,571 B2 | 9/2009 | Sifry |
| 7,599,844 B2 | 10/2009 | King et al. |
| 7,657,104 B2 | 2/2010 | Deninger et al. |
| 7,664,083 B1 | 2/2010 | Cermak et al. |
| 7,685,254 B2 | 3/2010 | Pandya |
| 7,689,614 B2 | 3/2010 | de la Iglesia et al. |
| 7,730,011 B1 | 6/2010 | Deninger et al. |
| 7,739,080 B1 | 6/2010 | Beck et al. |
| 7,760,730 B2 | 7/2010 | Goldschmidt et al. |
| 7,760,769 B1 | 7/2010 | Lovett et al. |
| 7,774,604 B2 | 8/2010 | Lowe et al. |
| 7,814,327 B2 | 10/2010 | Ahuja et al. |
| 7,818,326 B2 | 10/2010 | Deninger et al. |
| 7,844,582 B1 | 11/2010 | Arbilla et al. |
| 7,849,065 B2 | 12/2010 | Kamani et al. |
| 7,899,828 B2 | 3/2011 | de la Iglesia et al. |
| 7,907,608 B2 | 3/2011 | Liu et al. |
| 7,921,072 B2 | 4/2011 | Bohannon et al. |
| 7,926,099 B1 | 4/2011 | Chakravarty et al. |
| 7,930,540 B2 | 4/2011 | Ahuja et al. |
| 7,949,849 B2 | 5/2011 | Lowe et al. |
| 7,958,227 B2 | 6/2011 | Ahuja et al. |
| 7,962,591 B2 | 6/2011 | Deninger et al. |
| 7,979,524 B2 | 7/2011 | Dieberger et al. |
| 7,984,175 B2 | 7/2011 | de la Iglesia et al. |
| 7,996,373 B1 | 8/2011 | Zoppas et al. |
| 8,005,863 B2 | 8/2011 | de la Iglesia et al. |
| 8,010,689 B2 | 8/2011 | Deninger et al. |
| 8,055,601 B2 | 11/2011 | Pandya |
| 8,056,130 B1 | 11/2011 | Njemanze et al. |
| 8,166,307 B2 | 4/2012 | Ahuja et al. |
| 8,176,049 B2 | 5/2012 | Deninger et al. |
| 8,200,026 B2 | 6/2012 | Deninger et al. |

(56) References Cited

U.S. PATENT DOCUMENTS

| | | |
|---|---|---|
| 8,205,242 B2 | 6/2012 | Liu et al. |
| 8,205,244 B2 | 6/2012 | Nightingale et al. |
| 8,261,347 B2 | 9/2012 | Hrabik et al. |
| 8,271,794 B2 | 9/2012 | Lowe et al. |
| 8,301,635 B2 | 10/2012 | de la Iglesia et al. |
| 8,307,007 B2 | 11/2012 | de la Iglesia et al. |
| 8,307,206 B2 | 11/2012 | Ahuja et al. |
| 8,463,800 B2 | 6/2013 | Deninger et al. |
| 8,473,442 B1 | 6/2013 | Deninger et al. |
| 8,504,537 B2 | 8/2013 | de la Iglesia et al. |
| 8,560,534 B2 | 10/2013 | Lowe et al. |
| 8,601,537 B2 | 12/2013 | Lu et al. |
| 2001/0013024 A1 | 8/2001 | Takahashi et al. |
| 2001/0032310 A1 | 10/2001 | Corella |
| 2001/0037324 A1 | 11/2001 | Agrawal et al. |
| 2001/0046230 A1 | 11/2001 | Rojas |
| 2002/0032677 A1 | 3/2002 | Morgenthaler et al. |
| 2002/0032772 A1 | 3/2002 | Olstad et al. |
| 2002/0046221 A1 | 4/2002 | Wallace et al. |
| 2002/0052896 A1 | 5/2002 | Streit et al. |
| 2002/0065956 A1 | 5/2002 | Yagawa et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0128903 A1 | 9/2002 | Kernahan |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0055962 A1 | 3/2003 | Freund et al. |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105716 A1 | 6/2003 | Sutton et al. |
| 2003/0105739 A1 | 6/2003 | Essafi et al. |
| 2003/0105854 A1 | 6/2003 | Thorsteinsson et al. |
| 2003/0131116 A1 | 7/2003 | Jain et al. |
| 2003/0135612 A1 | 7/2003 | Huntington |
| 2003/0167392 A1 | 9/2003 | Fransdonk |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2003/0233411 A1 | 12/2003 | Parry et al. |
| 2004/0001498 A1 | 1/2004 | Chen et al. |
| 2004/0010484 A1 | 1/2004 | Foulger et al. |
| 2004/0015579 A1 | 1/2004 | Cooper et al. |
| 2004/0036716 A1 | 2/2004 | Jordahl |
| 2004/0054779 A1 | 3/2004 | Takeshima et al. |
| 2004/0059736 A1 | 3/2004 | Willse et al. |
| 2004/0059920 A1 | 3/2004 | Godwin |
| 2004/0071164 A1 | 4/2004 | Baum |
| 2004/0111406 A1 | 6/2004 | Udeshi et al. |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0122936 A1 | 6/2004 | Mizelle et al. |
| 2004/0139120 A1 | 7/2004 | Clark et al. |
| 2004/0181513 A1 | 9/2004 | Henderson et al. |
| 2004/0181690 A1 | 9/2004 | Rothermel et al. |
| 2004/0193594 A1 | 9/2004 | Moore et al. |
| 2004/0194141 A1 | 9/2004 | Sanders |
| 2004/0196970 A1 | 10/2004 | Cole |
| 2004/0205457 A1 | 10/2004 | Bent et al. |
| 2004/0215612 A1 | 10/2004 | Brody |
| 2004/0220944 A1 | 11/2004 | Behrens et al. |
| 2004/0230572 A1 | 11/2004 | Omoigui |
| 2004/0249781 A1 | 12/2004 | Anderson |
| 2004/0267753 A1 | 12/2004 | Hoche |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033726 A1 | 2/2005 | Wu et al. |
| 2005/0033747 A1 | 2/2005 | Wittkotter |
| 2005/0033803 A1 | 2/2005 | Vleet et al. |
| 2005/0038788 A1 | 2/2005 | Dettinger et al. |
| 2005/0038809 A1 | 2/2005 | Abajian et al. |
| 2005/0044289 A1 | 2/2005 | Hendel et al. |
| 2005/0050028 A1 | 3/2005 | Rose et al. |
| 2005/0050205 A1 | 3/2005 | Gordy et al. |
| 2005/0055327 A1 | 3/2005 | Agrawal et al. |
| 2005/0055399 A1* | 3/2005 | Savchuk .................. 709/203 |
| 2005/0075103 A1 | 4/2005 | Hikokubo et al. |
| 2005/0086252 A1 | 4/2005 | Jones et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138110 A1 | 6/2005 | Redlich et al. |
| 2005/0138242 A1 | 6/2005 | Pope et al. |
| 2005/0138279 A1 | 6/2005 | Somasundaram |
| 2005/0149494 A1 | 7/2005 | Lindh et al. |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0182765 A1 | 8/2005 | Liddy |
| 2005/0188218 A1 | 8/2005 | Walmsley et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0273614 A1 | 12/2005 | Ahuja et al. |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0075228 A1 | 4/2006 | Black et al. |
| 2006/0080130 A1 | 4/2006 | Choksi |
| 2006/0083180 A1 | 4/2006 | Baba et al. |
| 2006/0106793 A1 | 5/2006 | Liang |
| 2006/0106866 A1 | 5/2006 | Green et al. |
| 2006/0150249 A1 | 7/2006 | Gassen et al. |
| 2006/0167896 A1 | 7/2006 | Kapur et al. |
| 2006/0184532 A1 | 8/2006 | Hamada et al. |
| 2006/0235811 A1 | 10/2006 | Fairweather |
| 2006/0242126 A1 | 10/2006 | Fitzhugh |
| 2006/0242313 A1 | 10/2006 | Le et al. |
| 2006/0251109 A1 | 11/2006 | Muller et al. |
| 2006/0253445 A1 | 11/2006 | Huang et al. |
| 2006/0271506 A1 | 11/2006 | Bohannon et al. |
| 2006/0272024 A1 | 11/2006 | Huang et al. |

(56) References Cited

U.S. PATENT DOCUMENTS

| | | |
|---|---|---|
| 2006/0288216 A1 | 12/2006 | Buhler et al. |
| 2007/0006293 A1 | 1/2007 | Balakrishnan et al. |
| 2007/0011309 A1 | 1/2007 | Brady et al. |
| 2007/0028039 A1 | 2/2007 | Gupta et al. |
| 2007/0036156 A1 | 2/2007 | Liu et al. |
| 2007/0039049 A1 | 2/2007 | Kupferman et al. |
| 2007/0050334 A1 | 3/2007 | Deninger et al. |
| 2007/0050381 A1 | 3/2007 | Hu et al. |
| 2007/0050467 A1 | 3/2007 | Borrett et al. |
| 2007/0081471 A1 | 4/2007 | Talley et al. |
| 2007/0094394 A1 | 4/2007 | Singh et al. |
| 2007/0106660 A1 | 5/2007 | Stern et al. |
| 2007/0106685 A1 | 5/2007 | Houh et al. |
| 2007/0106693 A1 | 5/2007 | Houh et al. |
| 2007/0110089 A1 | 5/2007 | Essafi et al. |
| 2007/0112837 A1 | 5/2007 | Houh et al. |
| 2007/0112838 A1 | 5/2007 | Bjarnestam et al. |
| 2007/0116366 A1 | 5/2007 | Deninger et al. |
| 2007/0124384 A1 | 5/2007 | Howell et al. |
| 2007/0136599 A1 | 6/2007 | Suga |
| 2007/0139723 A1 | 6/2007 | Beadle et al. |
| 2007/0140128 A1* | 6/2007 | Klinker et al. ............... 370/238 |
| 2007/0143559 A1 | 6/2007 | Yagawa |
| 2007/0162609 A1 | 7/2007 | Pope et al. |
| 2007/0220607 A1 | 9/2007 | Sprosts et al. |
| 2007/0226504 A1 | 9/2007 | de la Iglesia et al. |
| 2007/0226510 A1 | 9/2007 | de la Iglesia et al. |
| 2007/0248029 A1* | 10/2007 | Merkey et al. ............... 370/255 |
| 2007/0260643 A1 | 11/2007 | Borden et al. |
| 2007/0271254 A1 | 11/2007 | de la Iglesia et al. |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0027971 A1 | 1/2008 | Statchuk |
| 2008/0028467 A1 | 1/2008 | Kommareddy et al. |
| 2008/0030383 A1 | 2/2008 | Cameron |
| 2008/0082497 A1 | 4/2008 | Leblang et al. |
| 2008/0091408 A1 | 4/2008 | Roulland et al. |
| 2008/0112411 A1 | 5/2008 | Stafford et al. |
| 2008/0115125 A1 | 5/2008 | Stafford et al. |
| 2008/0140657 A1 | 6/2008 | Azvine et al. |
| 2008/0141117 A1 | 6/2008 | King et al. |
| 2008/0159627 A1 | 7/2008 | Sengamedu |
| 2008/0235163 A1 | 9/2008 | Balasubramanian et al. |
| 2008/0263019 A1 | 10/2008 | Harrison et al. |
| 2008/0270462 A1 | 10/2008 | Thomsen |
| 2008/0276295 A1 | 11/2008 | Nair |
| 2009/0070327 A1 | 3/2009 | Loeser et al. |
| 2009/0070328 A1 | 3/2009 | Loeser et al. |
| 2009/0070459 A1 | 3/2009 | Cho et al. |
| 2009/0100055 A1 | 4/2009 | Wang |
| 2009/0157659 A1 | 6/2009 | Satoh et al. |
| 2009/0178110 A1 | 7/2009 | Higuchi |
| 2009/0187568 A1 | 7/2009 | Morin |
| 2009/0216752 A1 | 8/2009 | Terui et al. |
| 2009/0222442 A1 | 9/2009 | Houh et al. |
| 2009/0232391 A1 | 9/2009 | Deninger et al. |
| 2009/0235150 A1 | 9/2009 | Berry |
| 2009/0254532 A1 | 10/2009 | Yang et al. |
| 2009/0288164 A1 | 11/2009 | Adelstein et al. |
| 2009/0300709 A1 | 12/2009 | Chen et al. |
| 2009/0326925 A1 | 12/2009 | Crider et al. |
| 2010/0011016 A1 | 1/2010 | Greene |
| 2010/0011410 A1 | 1/2010 | Liu |
| 2010/0037324 A1 | 2/2010 | Grant et al. |
| 2010/0088317 A1 | 4/2010 | Bone et al. |
| 2010/0100551 A1 | 4/2010 | Knauft et al. |
| 2010/0121853 A1 | 5/2010 | de la Iglesia et al. |
| 2010/0174528 A1 | 7/2010 | Oya et al. |
| 2010/0185622 A1 | 7/2010 | Deninger et al. |
| 2010/0191732 A1 | 7/2010 | Lowe et al. |
| 2010/0195909 A1 | 8/2010 | Wasson et al. |
| 2010/0268959 A1 | 10/2010 | Lowe et al. |
| 2010/0332502 A1 | 12/2010 | Carmel et al. |
| 2011/0004599 A1 | 1/2011 | Deninger et al. |
| 2011/0040552 A1 | 2/2011 | Van Guilder et al. |
| 2011/0131199 A1 | 6/2011 | Simon et al. |
| 2011/0167212 A1 | 7/2011 | Lowe et al. |
| 2011/0167265 A1 | 7/2011 | Ahuja et al. |
| 2011/0196911 A1 | 8/2011 | de la Iglesia et al. |
| 2011/0197284 A1 | 8/2011 | Ahuja et al. |
| 2011/0208861 A1 | 8/2011 | Deninger et al. |
| 2011/0219237 A1 | 9/2011 | Ahuja et al. |
| 2011/0258197 A1 | 10/2011 | de la Iglesia et al. |
| 2011/0276575 A1 | 11/2011 | de la Iglesia et al. |
| 2011/0276709 A1 | 11/2011 | Deninger et al. |
| 2012/0114119 A1 | 5/2012 | Ahuja et al. |
| 2012/0179687 A1 | 7/2012 | Liu |
| 2012/0180137 A1 | 7/2012 | Liu |
| 2012/0191722 A1 | 7/2012 | Deninger et al. |

OTHER PUBLICATIONS

International Search Report and Written Opinion and Declaration of Non-Establishment of International Search Report for International Application No. PCT/US2011/024902 mailed Aug. 1, 2011 (8 pages).

Niemi, Constructing OLAP Cubes Based on Queries, Nov. 2001, pp. 1-7.

Schultz, Data Mining for Detection of New Malicious Executables, May 2001, pp. 1-13.

U.S. Appl. No. 13/047,068, filed Mar. 14, 2011, entitled "Cryptographic Policy Enforcement," Inventor(s) Ratinder Paul Singh Ahuja, et al.

U.S. Appl. No. 13/049,533, filed Mar. 16, 2011, entitled "File System for a Capture System," Inventor(s) Rick Lowe, et al.

U.S. Appl. No. 13/089,158, filed Apr. 18, 2011, entitled "Attributes of Captured Objects in a Capture System," Inventor(s) Ratinder Paul Singh Ahuja, et al.

U.S. Appl. No. 13/099,516, filed May 3, 2011, entitled "Object Classification in a Capture System," Inventor(s) William Deninger, et al.

U.S. Appl. No. 13/168,739, filed Jun. 24, 2011, entitled "Method and Apparatus for Data Capture and Analysis System," Inventor(s) Erik de la Iglesia, et al.

U.S. Appl. No. 13/187,421, filed Jul. 20, 2011, entitled "Query Generation for a Capture System," Inventor(s) Erik de la Iglesia, et al.

U.S. Appl. No. 13/188,441 filed Jul. 21, 2011, entitled "Locational Tagging in a Capture System," Inventor(s) William Deninger et al.

Webopedia, definition of "filter", 2002, p. 1.

Werth, T. et al., "Chapter 1—DAG Mining in Procedural Abstraction," Programming Systems Group; Computer Science Department, University of Erlangen-Nuremberg, Germany (cited by Examiner in Sep. 19, 2011 Nonfinal Rejection).

Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, approximated copyright 2004-2005, printed Mar. 12, 2009.

Microsoft Outlook, Out look, copyright 1995-2000, 2 pages.

Preneel, Bart, "Cryptographic Hash Functions", Proceedings of the $3^{rd}$ Symposium on State and Progress of Research in Cryptography, 1993, pp. 161-171.

U.S. Appl. No. 11/900,964, filed Sep. 14, 2007, entitled "System and Method for Indexing a Capture System," Inventor(s) Ashok Doddapaneni et al.

U.S. Appl. No. 12/190,536, filed Aug. 12, 2008, entitled "Configuration Management for a Capture/Registration System," Inventor(s) Jitendra B. Gaitonde et al. (P032).

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/360,537, filed Jan. 27, 2009, entitled "Database for a Capture System," Inventor(s) Rick Lowe et al.

(56) References Cited

OTHER PUBLICATIONS

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

U.S. Appl. No. 12/873,061, filed Aug. 31, 2010, entitled "Document Registration," Inventor(s) Ratinder Paul Singh Ahuja, et al.

U.S. Appl. No. 12/939,340, filed Nov. 3, 2010, entitled "System and Method for Protecting Specified Data Combinations," Inventor(s) Ratinder Paul Singh Ahuja, et al.

U.S. Appl. No. 12/967,013, filed Dec. 13, 2010, entitled "Tag Data Structure for Maintaining Relational Data Over Captured Objects," Inventor(s) Erik de la Iglesia, et al.

Mao et al. "MOT: Memory Online Tracing of Web Information System," Proceedings of the Second International Conference on Web Information Systems Engineering (WISE '01); pp. 271-277, (IEEE0-0-7695-1393-X/02) Aug. 7, 2002 (7 pages).

U.S. Appl. No. 13/422,791, filed Mar. 16, 2012, entitled "System and Method for Data Mining and Security Policy Management", Inventor, Weimin Liu.

U.S. Appl. No. 13/424,249, filed Mar. 19, 2012, entitled "System and Method for Data Mining and Security Policy Management", Inventor, Weimin Liu.

U.S. Appl. No. 13/431,678, filed Mar. 27, 2012, entitled "Attributes of Captured Objects in a Capture System", Inventors William Deninger, et al.

U.S. Appl. No. 13/436,275 filed Mar. 30, 2012, entitled "System and Method for Intelligent State Management", Inventors William Deninger, et al.

U.S. Appl. No. 13/337,737, filed Dec. 27, 2011, entitled "System and Method for Providing Data Protection Workflows in a Network Environment", Inventor(s) Ratinder Paul Singh Ahuja, et al.

U.S. Appl. No. 13/338,060, filed Dec. 27, 2011, entitled "System and Method for Providing Data Protection Workflows in a Network Environment", Inventor(s) Ratinder Paul Singh Ahuja, et al.

U.S. Appl. No. 13/338,159, filed Dec. 27, 2011, entitled "System and Method for Providing Data Protection Workflows in a Network Environment", Inventor(s) Ratinder Paul Singh Ahuja, et al.

U.S. Appl. No. 13/338,195, filed Dec. 27, 2011, entitled "System and Method for Providing Data Protection Workflows in a Network Environment", Inventor(s) Ratinder Paul Singh Ahuja, et al.

Walter Allasia et al., Indexing and Retrieval of Multimedia Metadata on a Secure DHT, University of Torino, Italy, Department of Computer Science, Aug. 31, 2008, 16 pages.

International Preliminary Report on Patentability Written Opinion of the International Searching Authority for International Application No. PCT/US2011/024902 dated May 7, 2013 (5 pages).

U.S. Appl. No. 13/896,210, filed May 16, 2013, entitled "System and Method for Data Mining and Security Policy Management" Inventor(s) Ratinder Paul Singh Ahuja et al.

U.S. Appl. No. 14/042,202, filed Sep. 30, 2013, entitled "Document De-Registration", Inventor(s) Ratinder Paul Singh Ahuja, et al.

\* cited by examiner

HIGH SPEED PACKET CAPTURE

RELATED APPLICATION

This application is a continuation of (and claims the benefit of priority under 35 U.S.C. §120) of U.S. application Ser. No. 11/202,438, filed Aug. 12, 2005, now U.S. Pat. No. 7,907,608 entitled "HIGH SPEED PACKET CAPTURE," Inventor(s) Weimin Liu, et al. The disclosure of the prior application is considered part of (and is incorporated by reference in) the disclosure of this application.

FIELD OF THE INVENTION

The present invention relates to computer networks, and in particular, to a network interface.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyse the data leaving the network to monitor for policy violations, and make it possible to track down information leeks. What is needed is a comprehensive system to capture, store, and analyse all data communicated using the enterprises network. It is advantageous for such a system to be able to capture a large number of packets with high speed.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
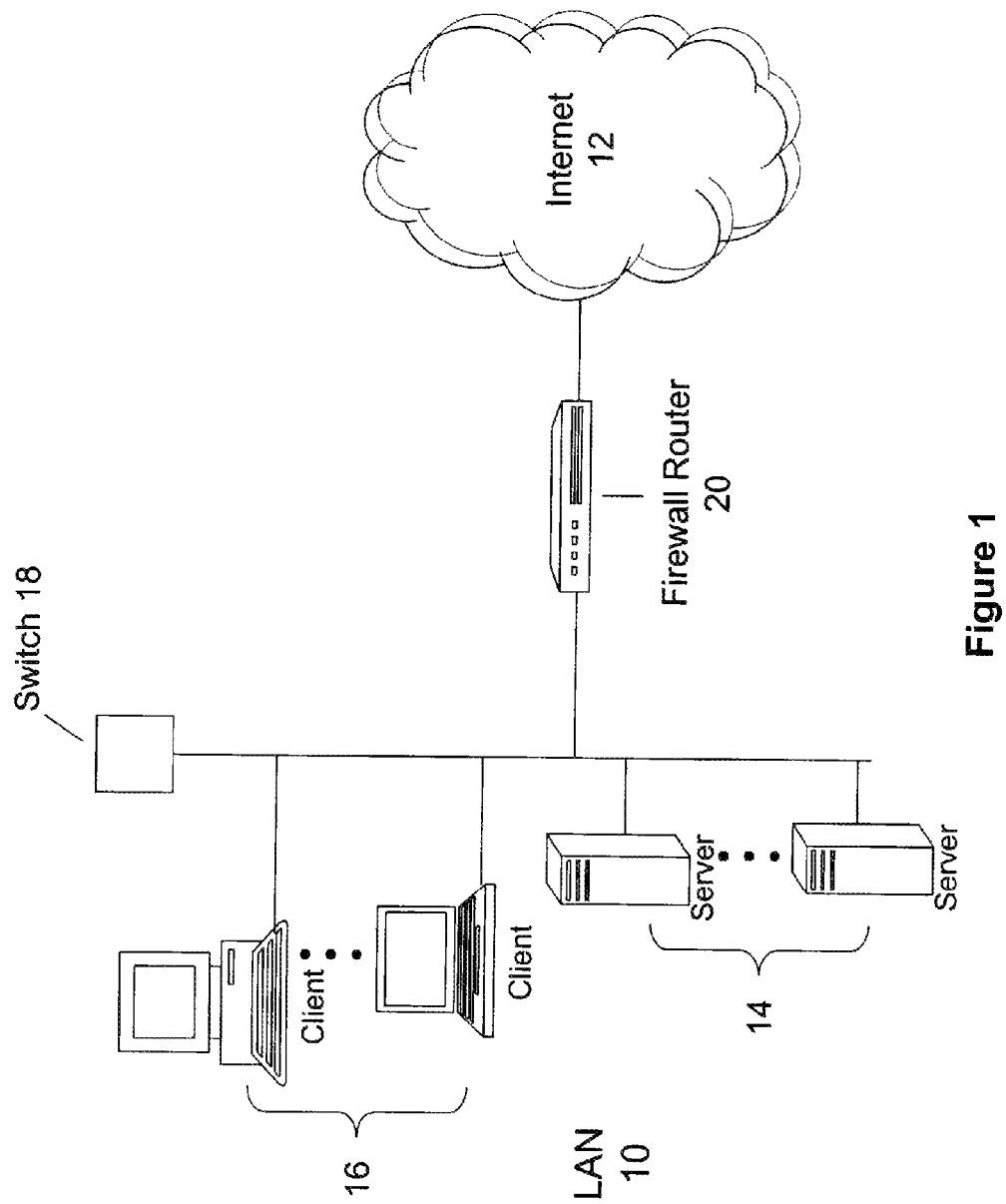
FIG. 1 is a block diagram illustrating a computer network connected to the Internet.

FIG. 1 illustrates a simple prior art configuration of a local area network (LAN) 10 connected to the Internet 12. Connected to the LAN 102 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 12. However, there the router 20 merely forwards packets to the Internet 12. The router 20 cannot capture, analyze, and searchably store the content contained in the forwarded packets.

Figure 2:
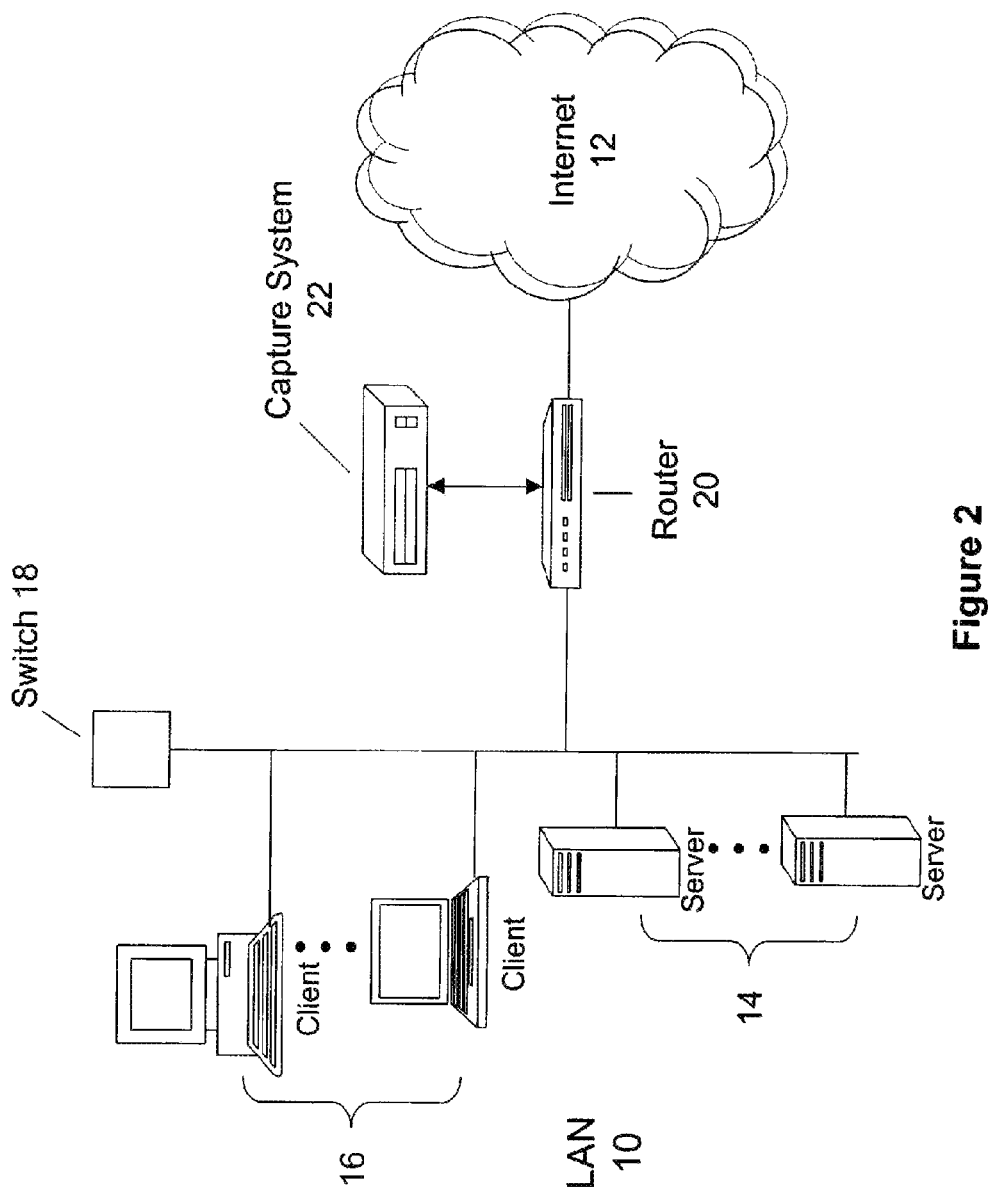
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 12 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 12 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
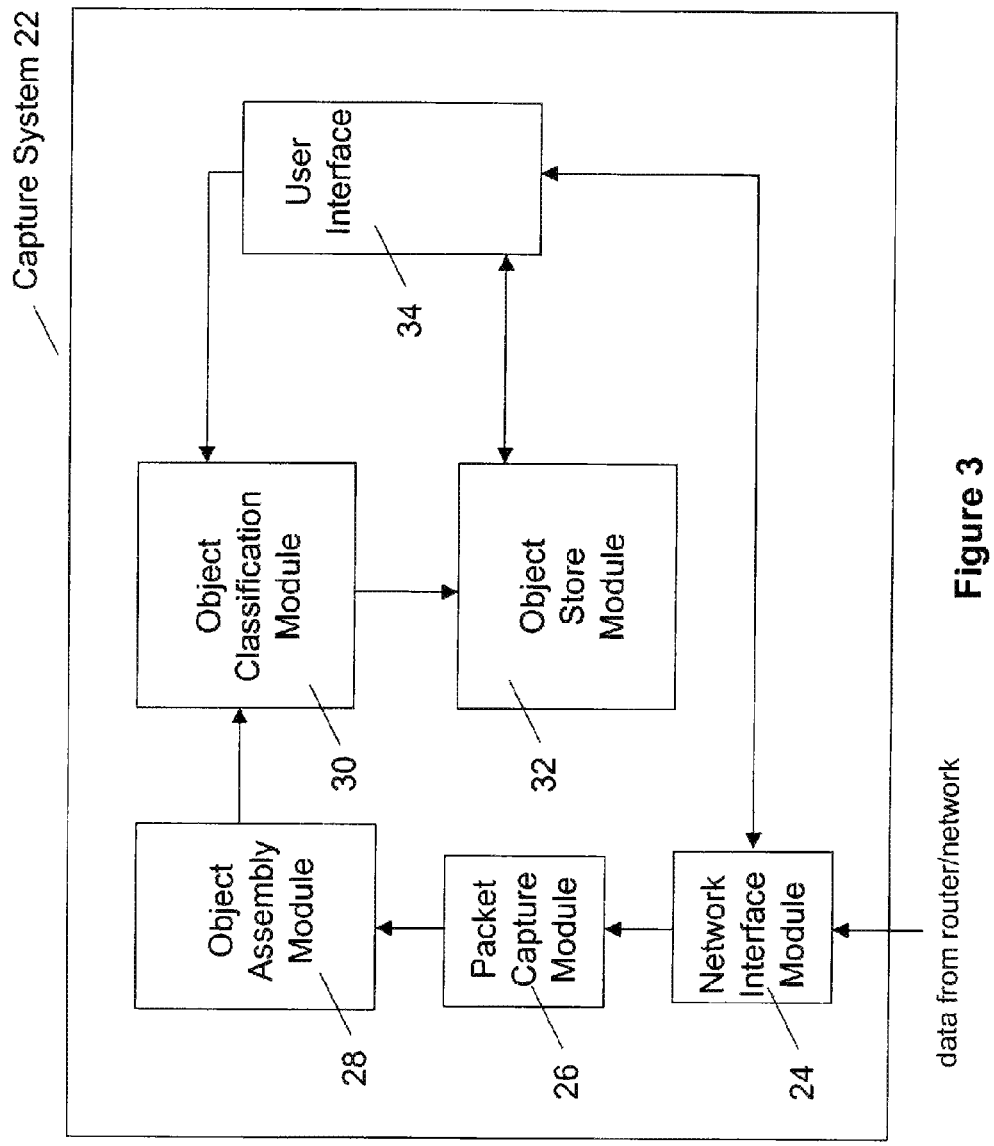
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
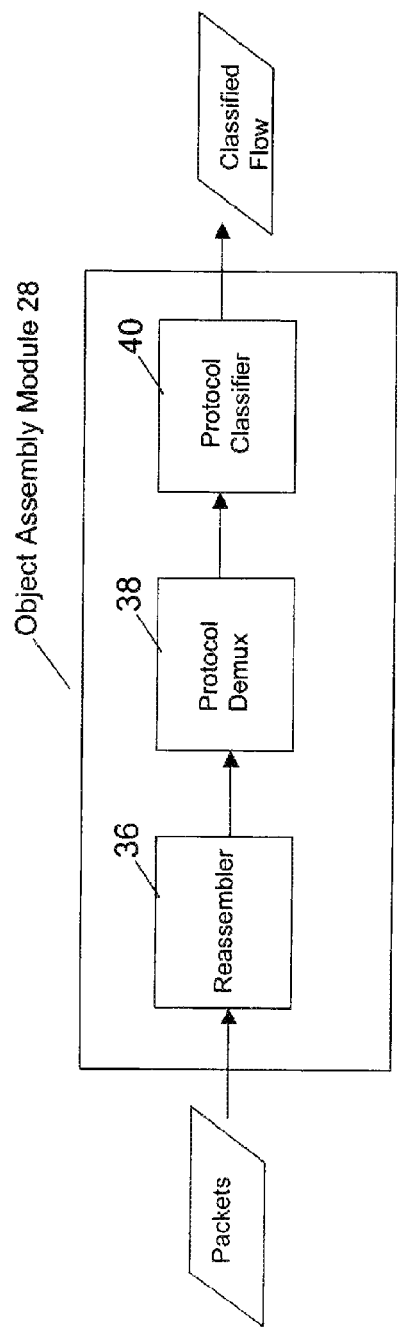
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the ressembler 36. Thus, in one embodiment, a flow is an ordered data stream of a single communication between a source and a destination.

The flown assembled by the reassember 36 can then is provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number, which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means. Several embodiments of the object classification module 30 are described in more detail further below.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
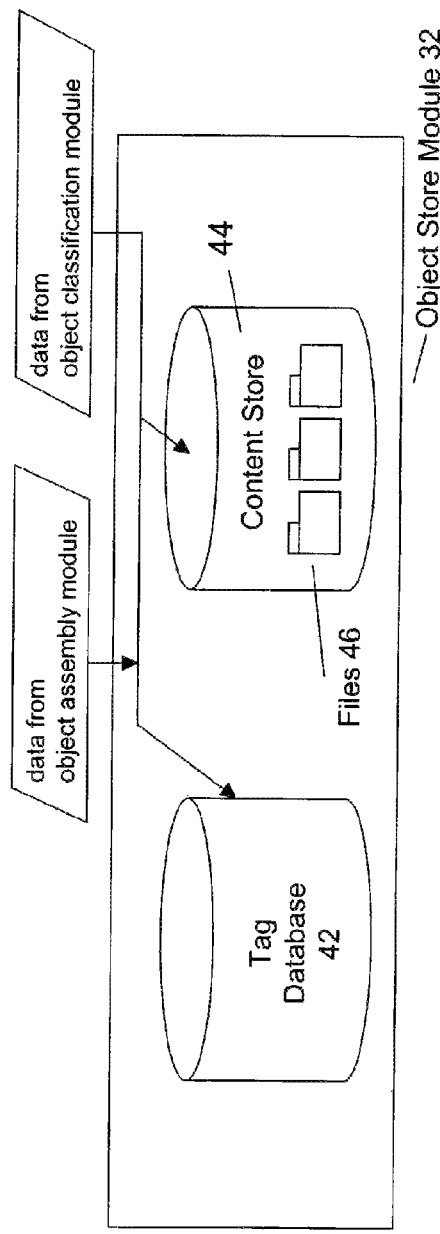
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

Tag Data Structure

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44 and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |

TABLE 1-continued

| Field Name | Definition |
| --- | --- |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database, and a tag need not be a record. Any data structure capable of indexing an object by storing relational data over the object can be used as a tag data structure. Furthermore, the word "tag" is merely descriptive, other names such as "index" or "relational data store," would be equally descriptive, as would any other designation performing similar functionality.

The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of the capture system 22. Only the capture system 22 knows its own private key, thus, the integrity of the stored object can be verified by comparing a hash of the stored object to the signature decrypted with the public key of the capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

Network Interface and Packet Capture

In one embodiment, packet capture—as described in connection with network interface module 24 and packet capture module 26 in FIG. 3 above—is performed by the operating system kernel of the capture system 22. Object capture, classification, and other object related processing is performed by various applications executing on the capture system 22. In traditional network communications, such as the TCP/IP system, incoming packets are copied to various buffers in the kernel for processing, such as the sk_buffer and the ip_table. On the application side, the packets are copied to a socket and then handed over to the application.

This traditional incoming packet processing is designed for generic network communications. However, a capture device receives more packets than an ordinary network communications device, such as a server. The multiple copies required by the traditional system slow down the processing of incoming network packets. Thus, in one embodiment, the present invention includes a packet capture system that only uses one kernel copy of a received packet before it is provided to an application on the application side.

Figure 7:
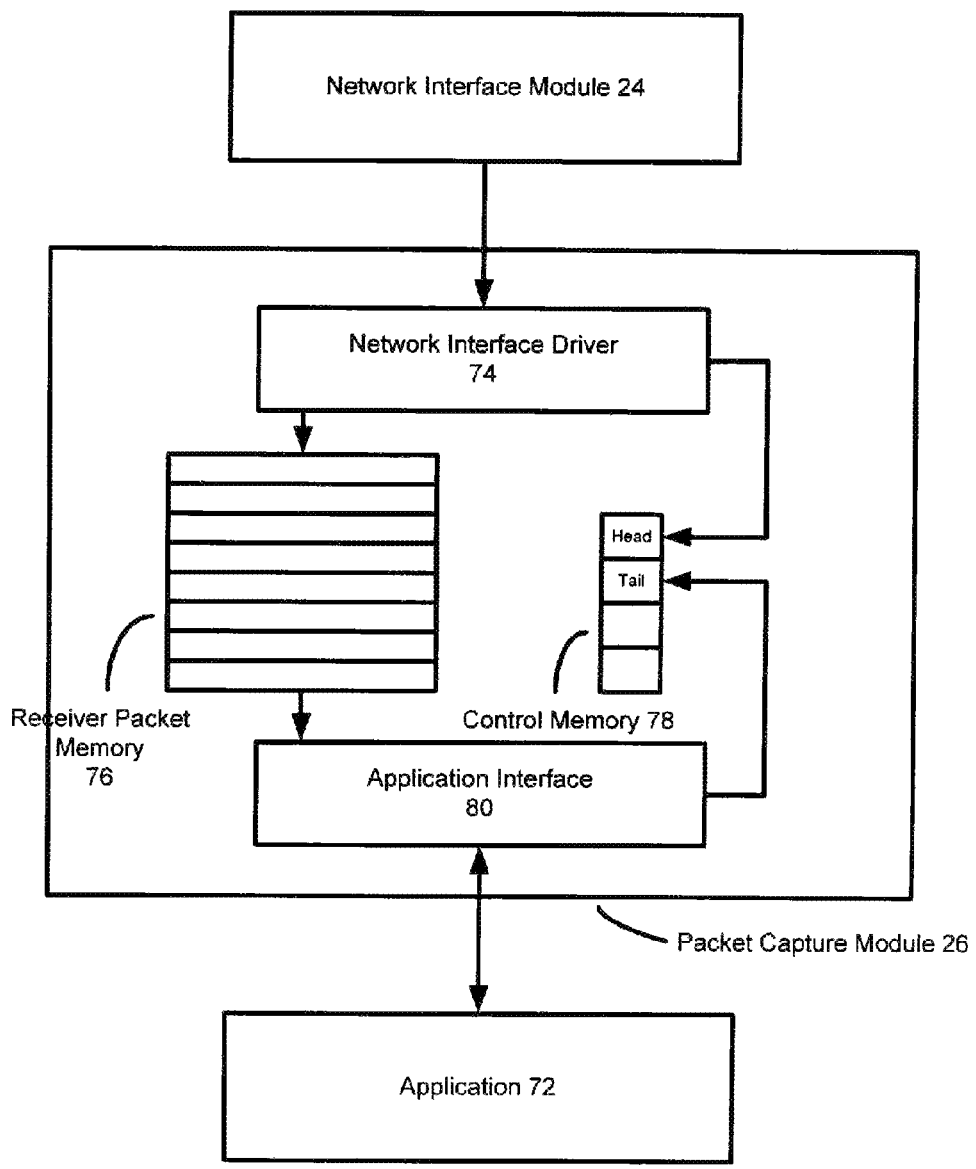
FIG. 7 is a block diagram illustrating a packet capture module of a capture device according to one embodiment of the present invention.

One embodiment of the present invention can be implemented in the packet capture module 26, discussed briefly with reference to FIG. 3. A more detailed discussion of one embodiment of the packet capture module 26 is now provided with reference to FIG. 7. FIG. 7 illustrates the packet capture module 26 disposed between the network interface module 24 and an application 72. The application 72 can be any of the applications executing on the capture system 22, such as object assembly, object storage, and object query applications.

In one embodiment, the network interface module 24 is a network interface card or an integrated network interface controller. The network interface module 24 may include more than one network interface cards or controllers, and each may have one or more receive ports on which packets can be received from the network. In one embodiment, the network interface module 24 and the packet capture module 26 operate on the kernel side (i.e., on the operating system side) of the capture system 22, while the application 72 resides on the application side.

In one embodiment, the packets received from the network interface module 24 are read into the packet capture module 26 by the network interface driver 74. The network interface driver is a device driver that interfaces the network interface module with the kernel of the capture system 22. Device drivers generally operate at low levels of the operating system kernel.

The network interface driver 74 is configured to place incoming packets into the receiver packet memory 76. In one embodiment, packets are placed in the receiver packet memory 76 in consecutive order in a wraparound fashion. In other words, the receiver packet memory 76 can be treated as an infinite circular buffer. In FIG. 7, each slot in the receiver packet memory 76 represents storage for one packet. In a real-life implementation, the receiver packet memory 76 can hold many more packets than pictured, limited practically only by the kernel memory available.

The receive packet memory 76 can be implemented using any appropriate memory components depending on the specifications of the computational platform. Various memories, such as Flash, RAM, and other volatile and non-volatile memories can be used. Such memories are commodity components in the computer electronics field.

In one embodiment, the packet capture module 26 includes an application interface 80 to enable the packet capture module 26 to communicate with the application 72. When the application 72 is ready to process captured packets, it can access unprocessed packets from the receiver packet memory 76 via the application interface 80.

In one embodiment, the application interface 80 represents the receiver packet memory 76 as a virtual device file. The application 72 can then migrate packets from the receiver packet memory 76 by memory mapping this virtual device file. By representing the receiver packet memory 76 as a file, the application 72 can use file system commands and handles to reference and manipulate data in the receiver packet memory 76. When the application 72 memory maps this file, the application may then use memory operators to manipulate the data contained within the file. In one embodiment, the file may be opened and mapped in a "read only" mode such that multiple applications may read and act on the data in the file at the same time.

In one embodiment, the packet capture module also includes a control memory 78 to enable various operations on the receiver packet memory. The control memory 78 can contain various pointers into the receiver packet memory 76, for example, to identify the start of each packet. In one embodiment, the control memory also contains a head and a tail pointer to help identify the unprocessed packets in the receiver packet memory 76.

In one embodiment, the head pointer points at the last packet inserted into the receiver packet memory 76 by the network interface driver 74. In another embodiment, the head pointer can also point to the packet after the last packet inserted into the receiver packet memory 76 by the network interface driver 74. Similarly, in one embodiment, the tail pointer points at the last packet migrated to the application 72 via memory-mapping by the application interface 80. Likewise, in another embodiment, the tail pointer points at the packet after the last packet migrated to the application 72 via memory-mapping by the application interface 80. The head and tail pointers can point directly into the receiver packet memory 76, or they could point indirectly by pointing at appropriate pointers in the control memory 78.

Thus, in one embodiment, the control memory 78 can be accessed by both the network interface driver 74, and by the application 72 via the application interface 80. The head pointer is updated by the network interface driver 74, while the tail pointer is updated by the application 72.

Figures 8A, 8B:
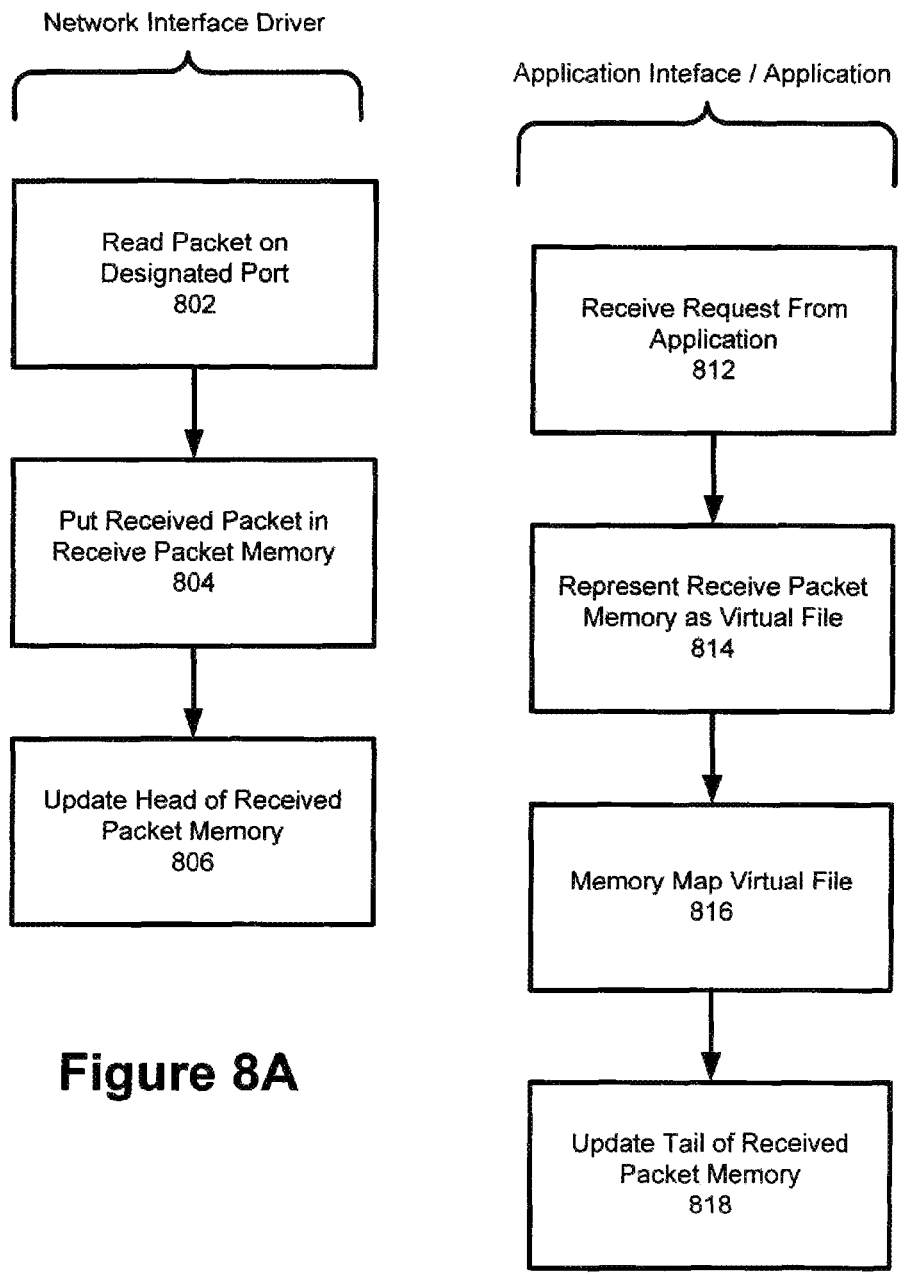
FIG. 8A is a flow diagram illustrating network interface driver processing according to one embodiment of the present invention.
FIG. 8B is a flow diagram illustrating application interface and application processing according to one embodiment of the present invention.

A more detailed operation of the network interface driver 74 and the application interface 80 is now provided with reference to the flow diagrams in FIGS. 8A and 8B respectively. One embodiment of the operation of the network interface driver 74—as illustrated by FIG. 8A—begins, in block 802, with the network interface driver 74 reading in a packet pulled from the network by the network interface module 24.

In one embodiment, the network interface module 24 includes a NIC having multiple ports. Some ports may be designated for packet capture, while others can be designated for other functions, such as user interface. In one embodiment, network interface driver 74 only performs packet capture processing (as illustrated by FIG. 8A) on ports designated for packet capture. Other ports are treaded as regular receive packets and are processed according to the appropriate receive protocol, such as TCP/IP, implemented in the capture system 22. In an embodiment, where the network interface module 24 includes multiple NICs, some NICs may be designated for packet capture processing, while others are not.

In block 804, the received packet in placed—written into—the receive packet memory. In one embodiment, the received packet in placed into the receive packet memory contiguously next to the last packet received in a wraparound fashion. Finally, in block 806, the network interface driver 74 updates the head indicator that marks the last new unprocessed received packet. The processing then continues as the next packet is received in block 802.

One embodiment of the operation of the application interface 80—as illustrated by FIG. 8B—begins, in block 812, with the application interface 80 receiving a request for data from an application 72. In response to the request, the application interface 80 represents the receiver packet memory 76 as a virtual file, in block 814, to the application 72. This can be done by providing the application 72 standard file handler and command pointers, as is known in the art.

In block 816, the application memory maps the virtual file provided by the application interface 80, which provides the application 72 the ability to perform memory operations on the receiver packet memory 76 in the application space. The application 72 can now read packets from the memory mapped virtual file to access packets between the tail and head indicators maintained by the packet capture module 26 as set forth above.

When the application 72 has processed all the packets it wanted to process on this access, the application 72 provides the tail indicator corresponding with the last processed packet to the application interface 80 in block 818, which in turn updates the tail indicator maintained by the packet capture module.

In one embodiment, multiple applications can access the receiver packet memory in the method described above. In such an embodiment, the packet capture module 26 can maintain multiple tail indicators to correspond with the last packet read in by each application.

General Matters

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
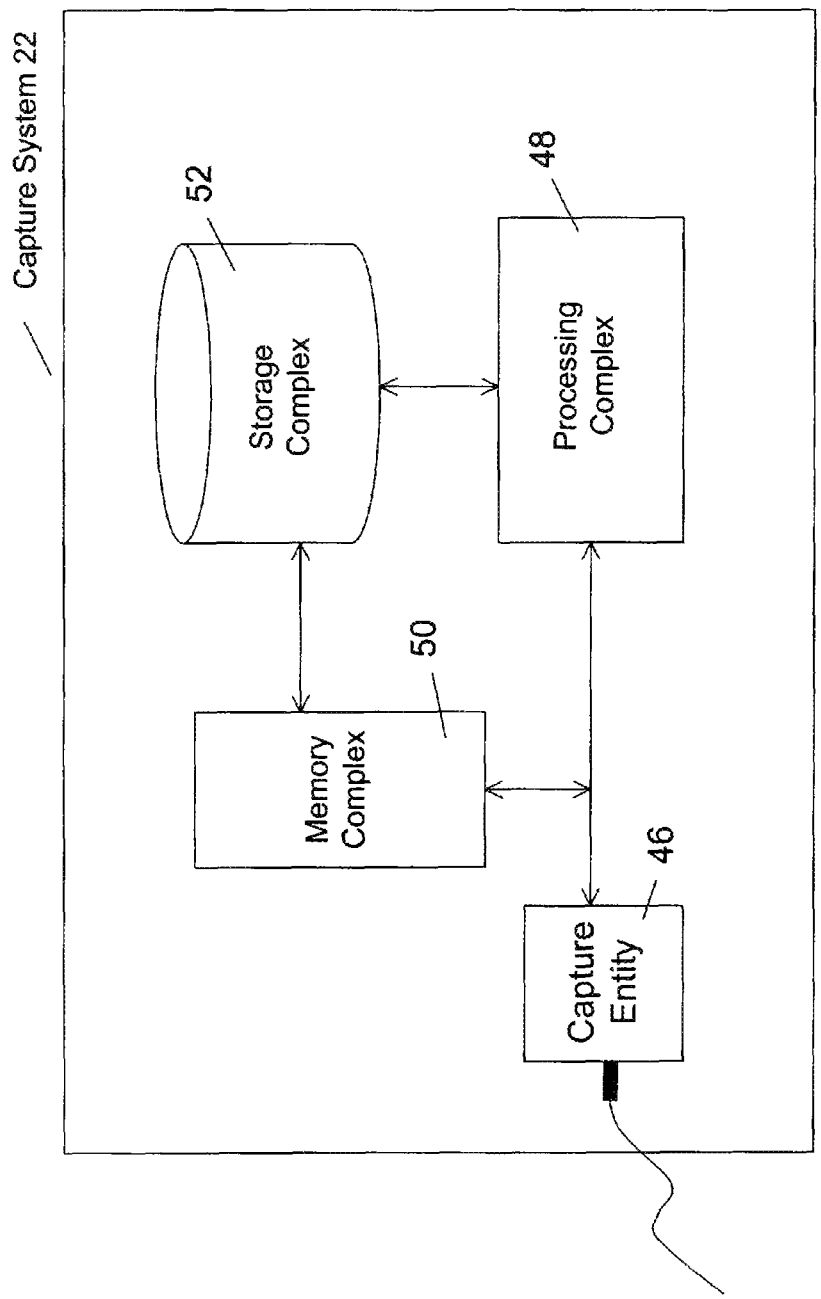
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Thus, a capture system and a file system for the capture system have been described. In the forgoing description, various specific values were given names, such as "objects," and various specific modules, such as the "packet capture module" and "control memory" have been described. However, these names are merely to describe and illustrate various aspects of the present invention, and in no way limit the scope of the present invention. Furthermore various modules can be implemented as software or hardware modules, or without dividing their functionalities into modules at all. The present invention is not limited to any modular architecture either in software or in hardware, whether described above or not.

The invention claimed is:

1. An apparatus, comprising:
  a capture system configured to couple to a router, which interacts with a plurality of clients in a network environment, wherein the capture system includes a packet capture module for receiving packets associated with traffic flows involving the clients and stores the packets in a receiver packet memory in the capture system;
  a network interface module; and
  an application, wherein the packet capture module operates between the network interface module and the application, and wherein the network interface module and the packet capture module operate on a kernel portion of the capture system that is separate from an application portion of the capture system;

wherein:
the packet capture module further includes a control memory accessible by the network interface module and by the application;
the control memory comprising a head pointer updated by the network interface module, and a tail pointer updated by the application;
the head pointer and the tail pointer identify the packets in the receiver packet memory which are unprocessed by the application.

2. The apparatus of claim 1, wherein at least some of the packets received from the network interface module are read into the packet capture module by a network interface driver that is configured to interact with both the network interface module and the kernel portion of the capture system, and wherein the capture system only uses one kernel copy of a received packet before it is provided to the application on the application portion of the capture system.

3. The apparatus of claim 1, wherein at least some of the packets received from the network interface module are placed in the receiver packet memory, which is accessible by the application via an application interface that represents the receiver packet memory as a file.

4. The apparatus of claim 3, wherein the file is opened and mapped in a read-only mode such that the file is accessible concurrently by multiple applications.

5. The apparatus of claim 3, wherein the control memory that includes pointers to the receiver packet memory for identifying certain locations of at least some of the packets in the receiver packet memory.

6. The apparatus of claim 5, wherein the control memory is accessible by the network interface module via a network interface driver and the application via the application interface.

7. The apparatus of claim 1, wherein packet capture processing is only performed on ports of the capture system designated for packet capture.

8. The apparatus of claim 1, wherein the application is a selected one of a group of applications, the group consisting of:
a) an object assembly application;
b) an object storage application;
c) an object query application; and
d) an object classification application.

9. The apparatus of claim 1, wherein the packet capture module includes an application interface configured to receive a request for data from the application and, in response to the request, to represent the receiver packet memory as a file to the application.

10. The apparatus of claim 9, wherein the application migrates certain packets from the receiver packet memory by performing a mapping to the file, the application using file system commands and handles to reference data in the receiver packet memory.

11. The apparatus of claim 1, wherein the capture system includes the receiver packet memory for storing at least some of the packets in a wraparound fashion such that they are placed contiguously next to a last new packet received.

12. A method, comprising:
receiving packets at a packet capture module of a capture system configured to couple to a router, which interacts with a plurality of clients in a network environment, wherein the packet capture module stores the packets in a receiver packet memory in the capture system; and
reading at least some of the packets via a network interface driver that is configured to interact with both a network interface module and a kernel portion of the capture system, wherein the packet capture module operates between the network interface module and an application, and wherein the network interface module and the packet capture module operate on the kernel portion of the capture system that is separate from an application portion of the capture system;
wherein:
the packet capture module further includes a control memory accessible by the network interface module and by the application;
the control memory comprising a head pointer updated by the network interface module, and a tail pointer updated by the application;
the head pointer and the tail pointer identify the packets in the receiver packet memory which are unprocessed by the application.

13. The method of claim 12, wherein at least some of the packets received from the network interface module are placed in the receiver packet memory, which is accessible by the application via an application interface that represents the receiver packet memory as a file.

14. The method of claim 13, wherein the file is opened and mapped in a read-only mode such that the file is accessible concurrently by multiple applications.

15. The method of claim 13, wherein the control memory includes pointers to the receiver packet memory for identifying certain locations of at least some of the packets in the receiver packet memory, and wherein the control memory is accessible by the network interface module via the network interface driver and the application via the application interface.

16. The method of claim 12, wherein packet capture processing is only performed on ports of the capture system designated for packet capture, and wherein the packet capture module includes an application interface configured to receive a request for data from the application and, in response to the request, to represent the receiver packet memory as a file to the application.

17. A non-transitory machine accessible storage medium having logic stored thereon, the logic when executed on a processor, cause the processor to:
receiving packets at a packet capture module of a capture system configured to couple to a router, which interacts with a plurality of clients in a network environment, wherein the packet capture module stores the packets in a receiver packet memory in the capture system; and
reading at least some of the packets via a network interface driver that is configured to interact with both a network interface module and a kernel portion of the capture system, wherein the packet capture module operates between the network interface module and an application, and wherein the network interface module and the packet capture module operate on the kernel portion of the capture system that is separate from an application portion of the capture system;
wherein:
the packet capture module further includes a control memory accessible by the network interface module and by the application;
the control memory comprising a head pointer updated by the network interface module, and a tail pointer updated by the application;
the head pointer and the tail pointer identify the packets in the receiver packet memory which are unprocessed by the application.

18. The medium of claim 17, wherein at least some of the packets received from the network interface module are placed in the receiver packet memory, which is accessible by the application via an application interface that represents the receiver packet memory as a file.

19. The medium of claim 18, wherein the file is opened and mapped in a read-only mode such that the file is accessible concurrently by multiple applications.

20. The medium of claim 18, wherein the control memory includes pointers to the receiver packet memory for identifying certain locations of at least some of the packets in the receiver packet memory, and wherein the control memory is accessible by the network interface module via the network interface driver and the application via the application interface.

* * * * *